Aug. 7, 1962   F. A. F. SCHMIDT   3,048,014
COMBUSTION CHAMBER FOR JETS AND SIMILAR ENGINES
Filed Dec. 12, 1958   6 Sheets-Sheet 1

INVENTOR
FRITZ A. F. SCHMIDT
BY
ATTORNEY.

INVENTOR
FRITZ A. F. SCHMIDT

Aug. 7, 1962 F. A. F. SCHMIDT 3,048,014
COMBUSTION CHAMBER FOR JETS AND SIMILAR ENGINES
Filed Dec. 12, 1958 6 Sheets-Sheet 5

FIG. 10.

INVENTOR
FRITZ A. F. SCHMIDT
BY
ATTORNEY.

United States Patent Office 3,048,014
Patented Aug. 7, 1962

3,048,014
COMBUSTION CHAMBER FOR JETS AND SIMILAR ENGINES
Fritz A. F. Schmidt, Dr. Seitz-Str. 33K, Murnau, Upper Bavaria, Germany
Filed Dec. 12, 1958, Ser. No. 780,021
Claims priority, application Germany July 7, 1955
28 Claims. (Cl. 60—39.23)

The present invention relates to a combustion chamber for jet and similar engines, and is a continuation-in-part of my co-pending application No. 595,518 filed July 2, 1956, now abandoned. The present invention more particularly relates to a combustion chamber having a primary section in which a small quantity of fuel is burnt under conditions which will produce a practically constant combustion temperature approaching the maximum temperature theoretically obtainable to supply heat for the main combustion process increasing the efficiency of the engine and insuring combustion even under unfavorable operating conditions. The combustion chamber in accordance with the present invention is suitable for all prime movers which employ a combustion chamber in their conventional design, i.e., for pure jet drives, turbine jet drives, as well as pure propeller turbine drives. In addition, this design can be used for all gas turbine plants for stationary purposes or marine, rail and road vehicles. There is a number of designs of combustion chambers with stage division, especially for afterburners. The problems for afterburners are, however, of completely different nature than the problems solved by the present patent application. With afterburners it is a question of stabilizing the combustion at essentially higher temperatures, higher speeds and with an atmosphere contaminated with exhaust gases. For normal combustion chambers—for which the present proposal is chiefly intended—an improvement of the stabilizing of the combustion at low temperatures and slow flow speeds is to be achieved. The application solves the problem of guaranteeing, and quickly effecting, ignition in the main combustion chamber where inherently poor ignition conditions prevail because of the control requirements. It solves it with the help of hot gases from the primary section and by special local arrangements in connection with defined vortex and flow conditions. Here completely different flow and ignition conditions prevail than in an afterburner.

The combustion chamber, in accordance with the present invention, is primarily intended for use with turbo jet engines, though the same may also be used in connection with similar engines, as, for example, gas turbine engines.

With the conventional combustion chamber designs of jet engines, and, in particular, of turbo jet engines for aircraft, certain difficulties are encountered, when the engine is throttled down to partial load, particularly at higher altitudes, and when aircraft is moving at a high velocity, as, for example, in a dive. Under these conditions there is a tendency of the flame in the combustion chamber to extinguish, i.e., flame-out. This is due to the fact that at lower load conditions, such as idling, the temperature of the combustion chamber drops, due to an increase of the air to fuel ratio, which is emphasized at higher speeds, and due to a decrease in the ambient air temperature at greater altitudes and a decrease of the temperature rise in the compressor, caused by a smaller compression ratio at the lower revolutions and smaller load. The flame-out is, of course, highly undesirable and dangerous in the operation of jet aircraft.

In most of the conventional combustion chambers, the load control is effected by regulation of the fuel-injection pressure providing, for example, a lower injection pressure at the lower loads, and vice versa. This impairs the atomization of the fuel at the partial load conditions, particularly at idling, and this impairment of the atomization, due to the reduction in the injection pressure further increases the danger of flame-out.

In addition, the stall limit of the compressor must be taken into consideration when regulating the combustion. This imposes requirements on the control which partially conflict with the desirable requirements for a suitable control of the combustion. The conventional combustion chambers have been able to meet the above requirement only by the use of very complicated control devices which have not proven too satisfactory.

One object of this invention is a combustion chamber design which overcomes the above-mentioned disadvantages. This and still further objects, will become apparent from the following desription, read in conjunction with the accompanying drawings, in which:

The combustion chamber, in accordance with the present invention, has a primary section in which a small quantity of fuel is injected and burnt, and serves almost exclusively for creating the necessary prerequisites for good ignition of the fuel injected into a secondary portion of the combustion chamber in which the main combustion process is effected. The primary section primarily serves for increasing the temperature of the combustion air introduced into the secondary section, thus insuring good self-ignition conditions in the secondary section. The fuel burnt in the primary section constitutes only a small fraction of the total amount of fuel burnt, the major portion of fuel being burnt in the secondary section with the engine control being effected by control of this fuel in the secondary section.

The combustion chamber, in accordance with the present invention, also preferably contains a third section, to which a supply of air, separate from the supply of air to the primary section, is passed, and in which section the combustion process initiated in the second section is completed.

Figure 1:
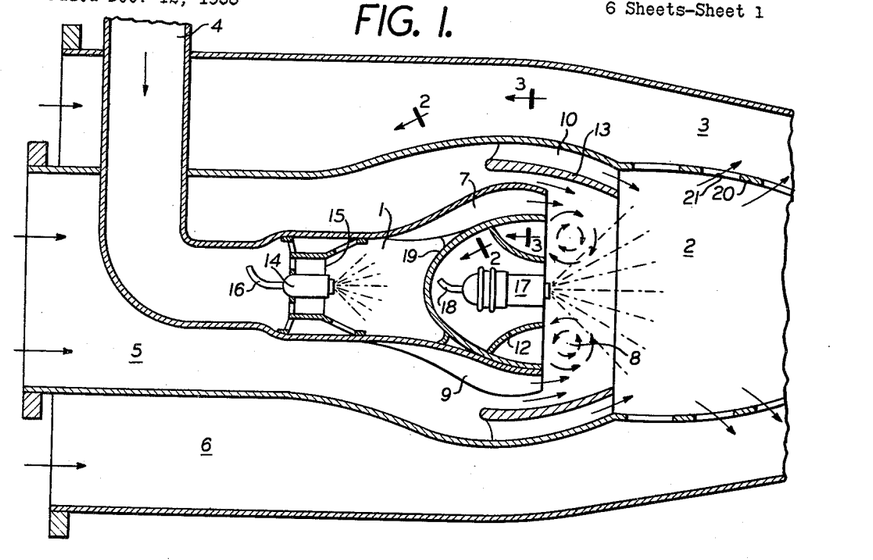
FIGURE 1 is a diagrammatic vertical section of an embodiment of a combustion chamber in accordance with the present invention.

Referring now to the drawings, and in particular to the embodiment as shown in FIG. 1, the combustion chamber is divided into a primary section 1, a secondary section 2, and a tertiary section 3. The secondary section is positioned just to the rear of, and has a somewhat larger diameter than, the primary section 1. The tertiary section 3 is in the form of an annular chamber surrounding the secondary chamber and positioned somewhat to the rear thereof. Each of the chambers has a separate air duct for supplying the combustion-supporting air. The air duct 4 for the primary section is centrally positioned with the air duct 5 for the secondary section in the form of an annular duct surrounding it. The air duct 6 for the tertiary section is also in the form of an annular duct defined by the outer surface of the duct 5 and the inner surface of the outer casing of the chamber.

Positioned at the forward end of the primary section 1 is the fuel injection nozzle 14 of conventional construction, which is mounted on the brackets 15, which allow the flow of air to pass therethrough, and is provided with the conventional fuel supply line 16 connected to a conventional fuel pump and metering device.

The rear end of the primary section is widened in a cup-like manner, and the stream-lined housing 19, which is closed at its forward end, is positioned in this wide end portion.

Figure 2:
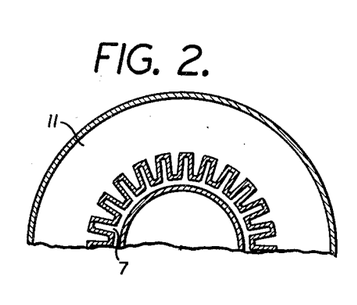
FIGS. 2 and 3 are partial cross-sections of the embodiment shown in FIG. 1, along the lines 2—2 and along the lines 3—3 of FIG. 1, respectively.
Figure 3:
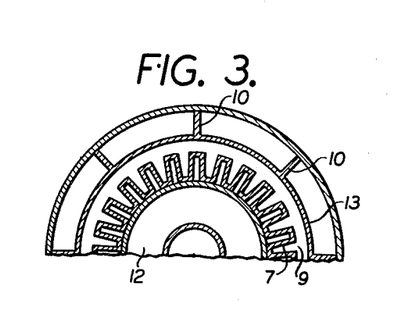

A multiple number of gas flow-passages 7, having a serrated cross-sectional shape, as may best be seen from FIGS. 2 and 3, surround the stream-lined housing 19 and lead from the primary section 1 into the secondary section 2. A fuel-injection nozzle 17 of conventional construction is positioned in the housing 19 for injecting fuel into the secondary section 2. The nozzle 17 has the fuel line 18, which is connected in a conventional manner to a fuel-supply pump and metering device. In the forward end of the housing 19 a vortex shield 12 is provided, which surrounds the nozzle 17.

The air-flow passage leading from the duct 5 into the secondary section 2 is sub-divided by means of an annular partition 13, which has the twisted flow-guide vanes or blades 10 radially positioned between it and the inner surface of the duct 5. A wall 20 with perforations 21 separates the secondary section 2 from the tertiary section 3.

The arrangement as shown in FIG. 1 allows the separate supply of air to each of the sections with air at a higher pressure being supplied to the primary section than to the secondary section, and air at a higher pressure being supplied to the secondary section than to the tertiary section. For particularly unfavorable conditions an additional heat source can be located in the entrance to the primary section. Depending on conditions, this heating could be accomplished, for instance, by conducting the air supply thru hot parts of the combustion space before entering the primary section. Possibly only artificial heating for starting may be considered, such as electric heat, by gas heating, or otherwise. The high entrance temperature into the primary section renders the ignition delay times of the fuel so short that a perfect ignition flame is always present, even under unfavorable conditions.

The additional compression of the air for the primary section is possible in various ways. A smaller auxiliary compressor could, for example, be coupled directly to the compressor shaft. Or, it is possible to add a few stages to the rotor of the main compressor which continue to compress only the air quantity for the primary section, while the main air quantity is drawn off behind the original stages. Of course, also an independent compressor could be used with a gear drive or with its own drive by a turbine stage. The latter possibility has the advantage of the additional compressor stage being independently controllable, i.e., it will generally run at constant speed, while the control of the main air quantity is effected by speed change of the main compressor. Which of the two methods is the most favorable has to be decided individually and depends on the purpose of the entire plant.

In operation, combustion air is forced through the air duct 4 into the primary section 1, while fuel from a fuel pump is forced in through the line 16 and sprayed into the chamber by means of the nozzle 14. The mixture ratio of the air and fuel should be maintained throughout the entire operating range of the engine at such a value that the combustion effected in the primary section 1 produces a temperature which approaches the maximum theoretical temperature obtainable.

In order that the air supplied through the duct 4 does not fall below a certain minimum value, when the engine is idling, and under lower load conditions, a separate compressor, which is independent of the engine, may be provided for supplying air to the duct 4. This separate compressor may be independently driven or may be driven by the main compressor through a suitable coupling, as, for example, an over-running clutch at speeds above certain minimum value with a separate drive provided for speeds below this minimum value.

The ignition in the primary chamber is first effected by means of a spark plug or spark electrodes or any other suitable starting device, and is thereafter self-perpetuating by the combustion heat.

At the same time the main quantity of fuel driving the engine is introduced through line 18 into the nozzle 17 and injected into the secondary section 2, while air from the main compressor is passed through the duct 5 into the secondary section. The ignition in the secondary section is effected by a spark plug, electrodes and/or by the heat of combustion from the primary section, and is thereafter self-perpetuating by its heat of combustion and by the heat of combustion produced in the primary section.

The hot combustion gases from the primary section flow through the serrated passages 7 into the secondary section 2, while at the same time the air flowing through the duct 5 is passed into the secondary section. The portion of the air which passes in contact with the outer surface of the passages 7 is heated, since with their particular serrated shape, these passages act as heating fins. As the hot combustion gases pass through passages 7 into the secondary section, they are directed at a direction tangential to the ignition vortex 8, so that the same increase the vortex speed. The velocity of the gases admitted from the passages 7 is increased by having a reduced outlet cross-section from these passages leading into the secondary section. The vortex flow formed upon the emergence of the hot combustion gases into the secondary section is a toroidal vortex. The portion of the combustion air passing through the duct 5 over the passages 7 is imparted a corresponding toroidal vortex flow, while the portion passing through the guide vanes 10 is imparted a twisting motion, and thus converted into the form of a helical or spiral vortex. The fuel spray from the nozzle 17 thus encounters a combination of a toroidal vortex and a helical vortex. The combustion air introduced into the secondary section through the duct 5 is thus divided into two parts in such a manner that the portion mixed with the combustion gases from the primary section are imparted high initial temperature and directed obliquely into the fuel spray, so that such a high initial temperature is obtained in the ignition vortex at any load, so that positive ignition is guaranteed in the secondary section, even at high air ratios.

Here is an exact description of the events in above paragraph: In the area of the main nozzle the following air and exhaust gas streams meet:

(1) The hot exhaust gases of the primary section;
(2) The combustion air of the secondary part, preheated in the duct;
(3) The air of the secondary section which is not preheated.

The following vortex formation is desired for good mixture to provide favorable conditions for the ignition in the area of the secondary air stream. The inner partial air stream, preheated by the duct, is mixed with the exhaust gases of the primary section, forming a stationary toroidal vortex, caused by the flow direction and the vortex shield. The outer partial stream of secondary air is forced into a spiral flow by means of guide vanes and meets the above stationary toroidal vortex for mixing.

The primary section should have a size sufficient to effect a temperature rise of several hundred degrees in the secondary section under all load conditions and operating conditions. This guarantees positive, quick, and complete ignition in the secondary section. Because of the increase of the initial combustion temperature in the secondary section, due to the pre-combustion in the primary section, the ignition, as well as the flame-out limits, are considerably improved.

The dividing of the hot gas flow and introducing it in a combined vortex improves the mixture generation and accelerates fuel vaporization. Because of the considerable increase of the reaction velocity with this method, the ignition times become shorter and the dwell of the fuel in the vortex can be shortened. This substantially increases the efficiency of the engine, since the requirements for complete combustion under normal conditions are more closely approached, due to the acceleration of the primary combustion.

The air should be passed into the primary section or the primary and secondary sections at a higher pressure than into the subsequent sections, so that a much faster mixing occurs in the secondary section which effects a uniform temperature distribution over the exit area of the combustion chamber with much shorter combustion travel and smaller volumes. It is thus possible to have a much higher specific loading of the combustion chamber. A pressure differential is preferably also effected between the primary and secondary sections, which insures rapid penetration of the fuel spray from the main ignition vortex into the helical vortex in the axial direction.

The reaction velocities during the initiation of the ignition depend upon the temperature and pressure in the mixture conditions. The local temperature and pressure increase in the primary section in connection with the temperature rise in the vortex formed in the secondary section guarantees excellent ignition qualities and improves the efficiency.

The expanding combustion gases from the secondary chamber then pass through the openings 21 and the perforated partition 20 into the tertiary section 3, where the same combine with the combustion air passed through the duct 6, and the combustion process is completed by the burning of any unburnt fuel. The flow from the section 2 to the section 3 and the mixing with the air in this section is effected with an outward flow direction, due to the higher pressure in the section 2. The tertiary section induces a more uniform temperature in the exit area of the section 2, which constitutes the main combustion chamber and overcomes the disadvantages of the conventional constructions in which a pronounced temperature drop always occurs toward the outer wall of a combustion chamber.

The control of the engine, as, for example, for load, compressor stall limit, etc., is almost exclusively effected by the quantity of fuel injected into the secondary section. This quantity may be varied either by the fuel pressure or by using intermittent injection and varying the duration of each individual injection cycle, either alone or in conjunction with variations in the fuel pressure.

It is of advantage to operate with an intermittent fuel injection at a nearly constant fuel pressure, since the same allows a good atomization of the fuel under all load and operating conditions, whereas variations in the injection pressure may detrimentally affect the atomization.

As to the division of the fuel and air quantities for the primary and secondary sections, the basic rule applies that the primary and secondary sections, the basic rule applies that the primary section should operate in the range of the theoretical mixture ratio. With a view to a small expenditure of power for the supplementary compression, the thru-flow of the primary section should be kept just large enough to still guarantee perfect ignition in the secondary section under the most unfavorable conditions under which that particular machine has to operate. Starting with this, the thru-flow of the primary section remains essentially constant for all other operating conditions, and the corresponding quantity ratios change with the design of the plant itself, i.e., according to air thru-flow, gas temperature, material, etc.

The existing control methods alter the fuel pressure within very large limits in order to change the fuel quantity, which also varies the atomization considerably, so that only very seldom the optimum conditions for combustion can be realized. True, other control methods hold the injection pressure of the nozzle constant while changing the thru-flow, however also this arrangement has disadvantages control-wise, because an optimum adjustment of the atomization to the respective air conditions (such as density for example), is not possible.

The present patent application uses a disc distributor as an injection device, which consists essentially of two rotating discs with slots, located between fixed discs. The two rotating discs are adjusted relative to each other by means of a centrifugal governor, rotating with them, and in that way change the effective slot opening. It is possible to obtain a predetermined dependence on rotational speed of the injected quantity by suitably designing the characteristic of the centrifugal governor. The air thru-flow, and with it the fuel quantity to be injected into a combustion chamber, depends in wide limits on the rotational speed and further, however in narrower limits, on other control influences. The control of the combustion chamber in dependence on rotational speed is effected by driving the above disc distributor proportional to the rotational speed, so that, with changing speed, the injected quantity is controlled by the effective thru-flow time. The other additional influences are controlled by altering the fuel pressure. As these additional influences affect the thru-flow weight of the air only in narrow limits, only relatively small pressure changes are necessary to comply with the requirements. This means that only relatively slight pressure changes are necessary, modifying the pressure within narrow limits, so that good jet formation is guaranteed in each case, i.e., the pressure will never fall below a certain minimum.

The provisions of the injection device permit to take care of several individual influences separately and combined. Such a possibility of quantity control at constant rotational speed is provided for, and consists of a non-rotating disc with a number of holes or slots on a common radius which can be turned relatively. This relative turning of the disc brings about a change of the effective slot angle. This control can be used either by itself or in connection with pressure regulation.

For gas turbine operation the required fuel quantity generally varies greatly from the smallest load to the highest. This variation of the fuel quantity with the operating condition is primarily dependent on the variation of the revolutions. In addition it is also dependent on the respective load, the atmospheric condition and further secondary influences. In the control system described in this application the variation of the fuel quantity in dependence on revolution is obtained primarily by controlling the ecective injection time, i.e., by intermittent injection, while the injection pressure is varied only to the extent to obtain good atomization in all load conditions without any difficulty. At the same time the pressure control is also used to meter the fuel quantity in dependence on load. There are numerous possibilities to realize this control principle; by using constant delivery pumps as well as piston pumps whose injection duration is controlled.

With piston pumps the injected quantity per cycle is generally determined in dependence on the revolution and by varying the effective duration of the injection. However, a control of the quantity by the fuel pressure is not simply possible. Because of the low compressibility of the fuel it is immaterial to a large degree with what pressure the piston is being charged. However, it must be admitted that also in this case a secondary control can be achieved by additionally varying the fuel quantity to the combustion chambers by a relief valve which is controllable by varying the spring tension, for instance. This varies the fuel pressure to the nozzles of the combustion chambers by relief valve control.

These control principles can be realized in a particularly simple way by means of a control distributor known per se. The following deals with the control of the gas-turbine combustion chamber for stationary-mobile units and also for aircraft.

Here the control problems are considerably increased by the combination of the various components such as compressor, combustion chamber and turbine which differ widely in their design.

Present-day control members have only a few operating possibilities and can therefore fulfill these various tasks—in particular with a view to maximum efficiency—either very imperfectly, or by extremely complicated means. Of all the various gasturbine plants those for aircraft require probably the largest effort for their overall control because of the considerable variations of the operating conditions. For this reason we will describe first of all a control by means of a control distributor especially for aircraft drives. In a similar way—and partly greatly simplified—such a control can also be applied to the other turbine plants.

The control of aircraft drives (PTL=turboprop, TL= jet engine) is influenced by many factors and comprises the cooperation of the various components of the drive under the most diversified outward conditions such as starting and landing, flying near the ground and at altitude, flying on cold and warm days, flying at high and slow speed, dive, acceleration and braking, etc. Each individual component has definte critical operating ranges: a compressor starts so-called "pumping" when the delivery volume falls below a certain minimum; the combustion chamber can suffer "flame-out" at great altitude or at high speed; in the gasturbine the first blades are particularly endangered by the high gas temperatures occurring at full load.

The above indicates that the control of the fuel quantity is relatively difficult, as many factors must be taken into consideration. This application uses a control distributor known per se, which allows to fulfill all the required conditions. Before dealing with the details of the control of aircraft drives by means of a control distributor, the required fundamentals will be explained first.

Figure 6:
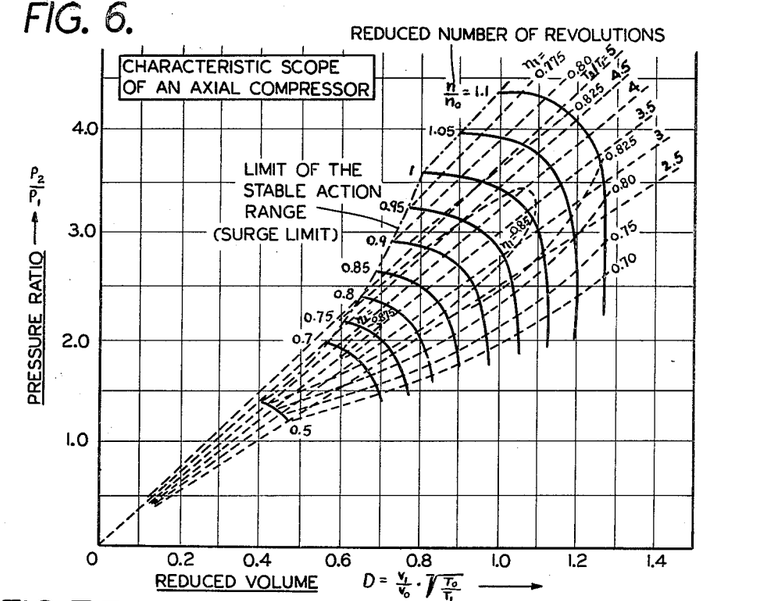
FIGS. 6, 7, 8 and 9 are curves indicating the engine operating characteristics.

The laws of the mechanics of similarity permit to reduce a large part of the parameters by introducing dimension-less factors or reduced quantities respectively. FIG. 6 shows such a graph for the characteristic of a compressor. The reduced volume $$V_{red} = \frac{V_1}{V_0}\sqrt{\frac{T_0}{T_1}}$$

where $V_1$; $V_0$ = intake volume
$T_1$; $T_0$ = gas temperature, abs.

is plotted on the abscissa, $V_0$ and $T_0$ being a random starting point. Condition 1 designates the condition before the compressor in reference to the stagnation point. The ordinate shows the pressure ratio $P_1$ to $P_2$ where index 2 designates the condition after leaving the compressor. For the time being the parameters are curves of equal revolutions. By showing the characteristic with reduced quantities it is possible to use the determined characteristic also for a different starting condition. Thus the influence of altitude can directly be found simply by determining the reduced quantities from the real quantities $V_1$, $N_1$, $P_1$ and $T_1$. The position of the curves of equal efficiency and also the position of the "pump"-limit (limit of the stable operating range) remain unchanged in this characteristic using reduced quantities.

In addition, this characteristic shows curves of equal inlet temperature before entering the turbine, assuming the case of speed of sound in the vanes. In this case the curves are approximately straight lines.

Figure 7:
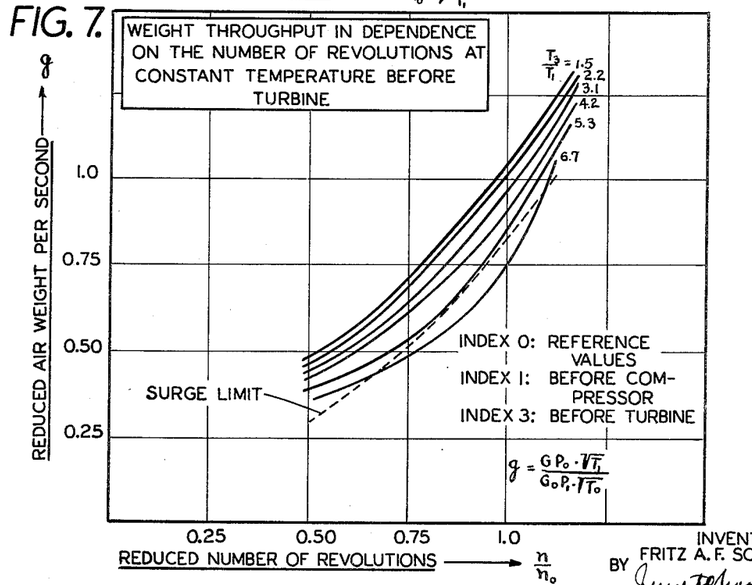
Figure 8:
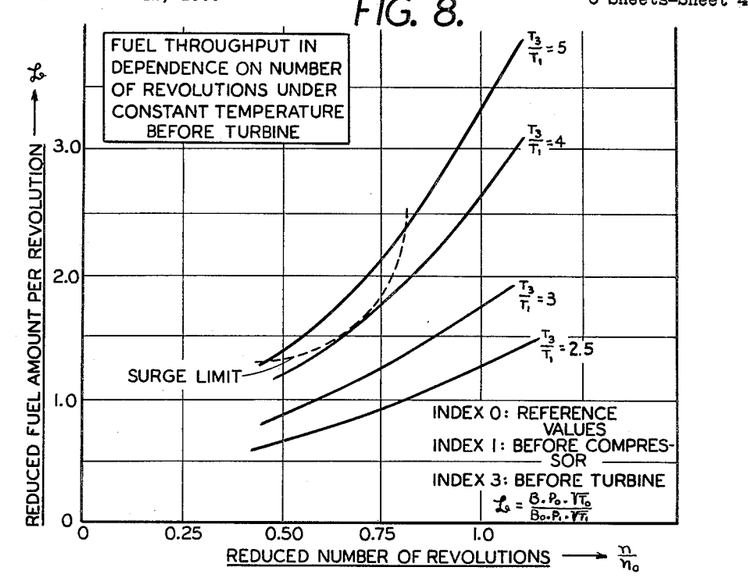

Starting with FIG. 6 the reduced thru-flow weight $G_{red}$ was shown over the reduced revolution $$\frac{n}{n_0}$$

in FIG. 7. Also here the selected parameters are lines of constant temperature before the turbine. It becomes evident that the lines of constant temperature at the combustion chamber exit (approx. entrance into the turbine) and in this presentation show a monotone trend. Starting from this fact, the required fuel flow per time unit was determined—again in reduced form—in dependence on the drive's revolutions and the temperature before the turbine. (FIG. 8.) The fuel flow per time unit depends in a considerable degree on the revolution increasing appr. proportionally with it. For high turbine entrance temperatures (full load), the required fuel quantity is considerably larger than at low entrance temperature (partial load).

Figure 9:
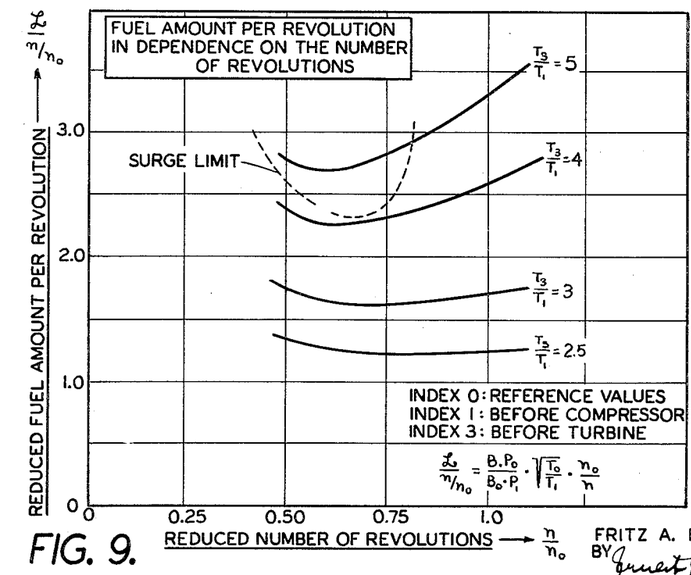

FIG. 9 shows the fuel quantities required per revolution taken from FIG. 8. This shows that the required fuel quantity changes little at medium speed, while it rises slightly at slow and at high speeds. Essential is that at full load the "pump" limit of the compressor is reached in a certain speed range. This makes it necessary to make provisions to avoid the "pump" limit of the compressor under all conditions.

The following describes how—starting from FIG. 6 to 9—control of a PTL— and a TL—drive can be accomplished.

Figure 10:
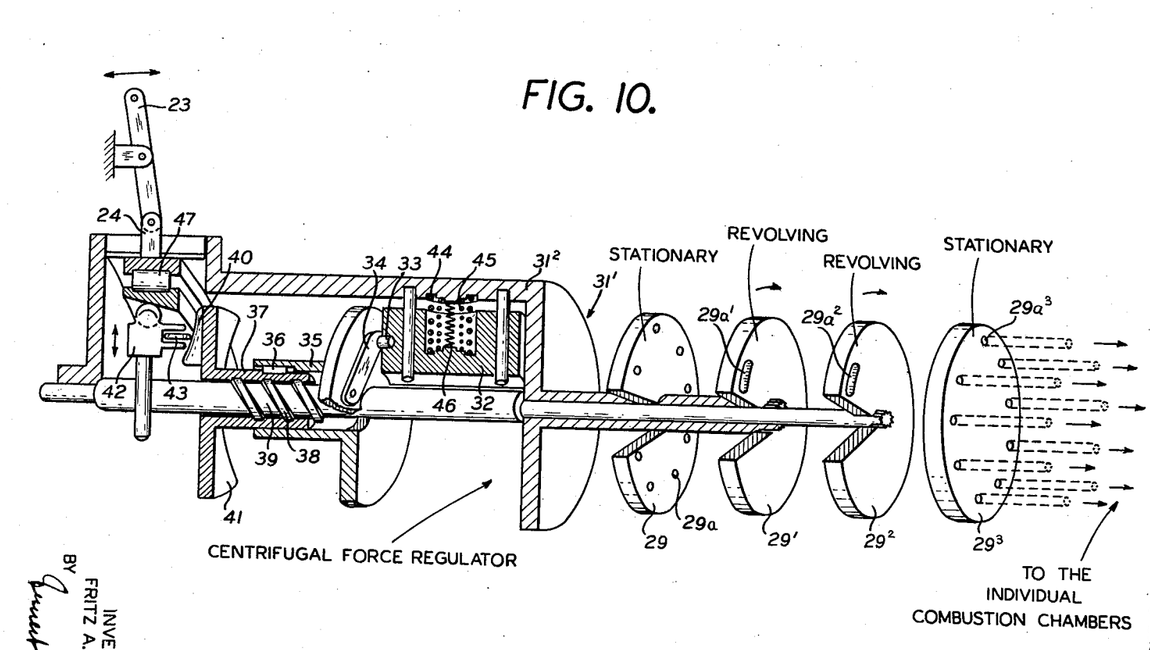
FIG. 10 diagrammatically shows the embodiment of a fuel distributor for use in accordance with the present invention, and FIG. 11 diagrammatically shows an entire control arrangement in accordance with the present invention.

The control distributor consists essentially of two fixed discs with two rotating discs inbetween them which have slots. This is schematically shown in FIG. 10. The two rotating discs are turned by a likewise rotating centrifugal governor relative to each other and thus vary their effective slot angle. By providing a suitable characteristic of the centrifugal governor it is possible to realize a certain predetermined dependence of the injected quantity on the revolutions. FIG. 9 shows that the fuel quantity to be delivered in dependence on the revolutions has basically a similar characteristic for the various load stages. The required fuel quantity changes little in its absolute value in the range of medium revolutions, however increases in the ranges of higher and lower revolutions at all load stages. This change of the fuel quantity with revolutions can be accomplished in a simple way with the described control system by controlling the angular motion of the flyweights and therewith the control impulse by a corresponding selection of the spring characteristic of the governor, so as to produce the desired quantity.

When the speed changes, three different springs come into action successively for the movement of the flyweights. By a proper selection of the stiffness of the springs and the time of their engagements, the desired dependence of the fuel quantity per revolution on the revolutions can easily be obtained.

Thus, the metering of the required fuel quantity for the combustion chambers in dependence on the revolutions is accomplished by driving said disc distributor in relation to the revolution and by controlling the effective injection time when the revolutions vary. The further additional influences are controlled by varying the injection pressure. The required fuel quantity for various loads can now be controlled by the fuel pressure in a way similar to the control of automotive injection engines. FIG. 9 shows for different load stages and different temperatures $T_3$ before the turbine respectively the fuel quantities required per revolution in dependence on the revolutions of the engine. Starting from one of these curves, a proportional variation of the fuel quantity results when the fuel pressure is changed. That means that when changing from one revolution to another, the ratio of the injected quantities remains essentially the same at the various fuel pressures. When the curves of FIG. 9 are moved in their ordinates only proportionally, it suffices to control the fuel quantity for different loads solely by the fuel pressure. In cases where the curves deviate from this rule, the quantities can easily be realized by a movement of the load lever operating a three-dimensional control cam inside the above described control distributor, which effects a relative turning of the two rotating discs.

In FIG. 9 the reduced fuel weight is plotted as the ordinate. By definition the absolute fuel weight is proportional to the outer pressure $P_1$ and inversely proportional to the square root of the ambient temperature $T_1$. Both influences—ambient pressure and ambient temperature—can be compensated by bellows and thermostats influencing the spring tension of the pressure regulator. With aircraft drives these provisions can easily take care of the influences of altitude ($P_1$; $T_1$) as well as flying speed (because of the change of the total temperature $T_1$ total and the total pressure $P_1$ total). Among others it is possible to alter the leverage of a lever by bellows and thermostats in such a way that the influence of the load position effects the tension of the spring of the pressure regulator in various degrees.

The "pump" range of the compressor can be avoided by the three-dimensional cam which is moved in one direction in dependence on revolutions and in the other direction in dependence on the load.

For this purpose this "space" cam has a steep rise at those locations which correspond to the "pump" limit in the characteristic. This rise begins already at a certain safety distance from the "pump" limit. This rise of the control surface controls a very pronounched decrease of the fuel quantity which eliminates reaching the "pump" limit. In the same way can the three-dimensional control surface prevent exceeding the maximum revolutions.

The distributor disclosed in FIG. 10 is meant for a drive with nine combustion chambers. The fuel quantity is apportioned to the individual chambers by the slots $29a'$ and $29a^2$, respectively, of the rotating discs $29'$ and $29^2$, rotatably adjustable relative to each other by means of a centrifugal governor $31'$, the elements $31^2$ and $31^3$ of the centrifugal governor $31'$ being operatively connected with the discs $29'$ and $29^2$. The slots $29a'$ and $29a^2$ of the rotating discs $29'$ and $29^2$ establish communication between the holes $29a$ of a fixed disc $29$, which is in constant connection with the fuel supply, and the delivery holes $29a^3$ of a fixed disc $29^3$. The fuel quantity is controlled by turning the disc $29^2$ in relation to the rotating disc $29'$, which changes the effective slot length. This relative turning is effected by the centrifugal governor $31'$. The flyweights 32 are disposed in the rotating housing $31^2$ of the centrifugal governor $31'$. A greater spacing between the flyweights is brought about by the centrifugal forces in dependency upon the number of revolutions and of the characteristics of the three springs 44, 45 and 46 and, thereby, a relative turning of the shaft 35 in relation to the rotating housing $31^2$ takes place by means of the pin 33 and the lever 34. A shaft 37 driven by the shaft 35 over the guide 36 is in operative connection with the shaft 39 over the thread 38, so that the rotation of the shaft 35 is transmitted to the shaft 39 and a relative turning of the disc $29^2$ relative to the disc $29'$ is brought about. Furthermore, the shaft 37 can be axially moved over the guide 36. The shaft 37 has secured thereto the control cam 40 having a three-dimensional control face and for the compensation of the one-sided centrifugal forces a compensation member 41. The member 42 joins the rotation of the governor housing $31^2$ and is guided in such manner that it can perform radial movements. It carries the control-roller 43, which engages the control cam 40 having the three-dimensional control face. The member 42 can be moved in radial direction along an inclined engagement face by means of the lever 23. The shaft 37 is moved axially in response to the number of revolutions and the load-adjustment due to the different level of the control-cam 40 having the three-dimensional control face. This axial movement causes an additional turning of the shaft 39 by the thread 38 and, thereby, of the disc $29^2$ relative to the disc $29'$.

Figure 11:
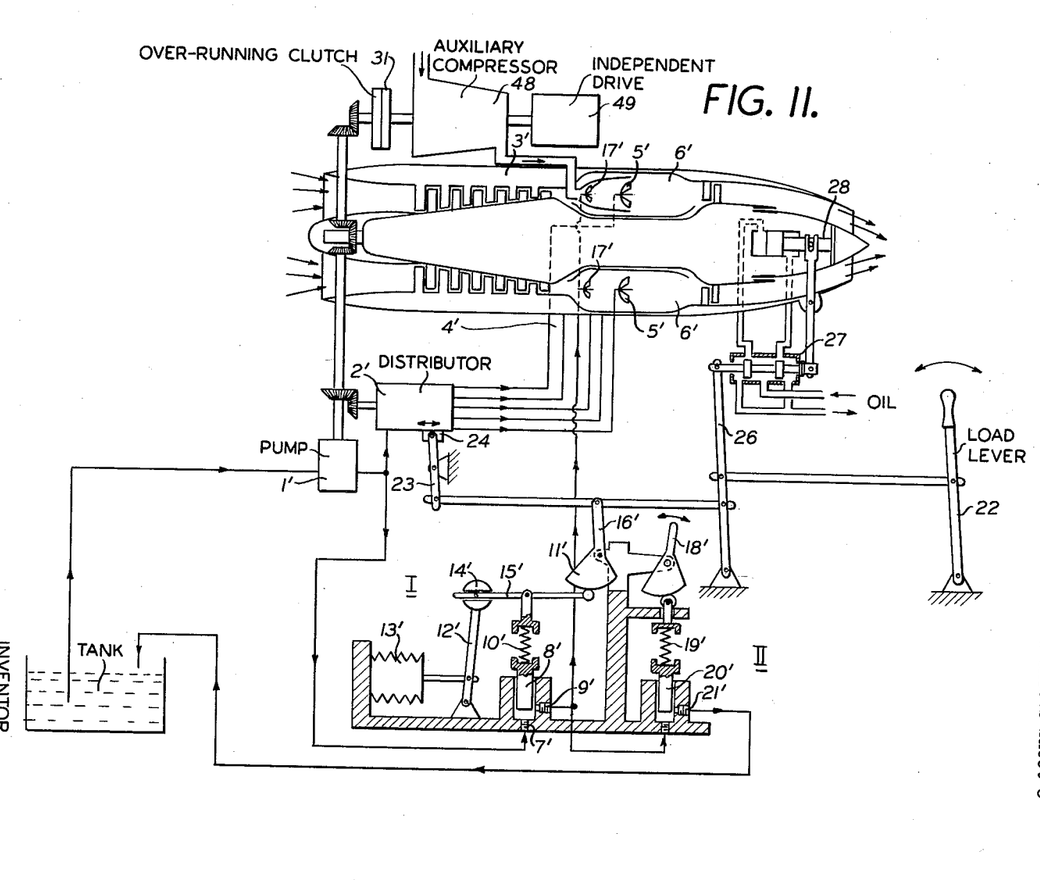

FIG. 11 is a complete arrangement of the control of such a drive. Fuel pump $1'$ and distributor $2'$ are driven synchronous with the revolutions of drive $3'$. The fuel—pressurized by pump $1'$—flows to the discs of distributor $2'$ which injects it into combustion chambers $6'$ via the individual fuel lines $4'$ and main nozzles $5'$. Metering in dependence on revolutions is effected—as described above—by adjusting the effective slot angles or the rotating discs by means of the centrifugal governor inside the distributor. Control of the fuel pressure in front of the distributor discs is effected by pressure regulator I. Thru hole $7'$ the fuel reaches the face of piston $8'$ and flows out thru hole $9'$. By changing the tension of spring $10'$ the fuel pressure in the distributor and in the nozzles $5'$ can be controlled. The tension of spring $10'$ is changed first by space cam $11'$ and then also by linkage $12'$, actuated, for instance, by partially evacuated bellows $13'$ or by a separate bellows and a thermostat. Bellows $13'$ responds to ambient pressure and ambient temperature, i.e., it compensates the influence of altitude. Moving fulcrum $14'$ changes the ratio of lever $15'$ so that a turning of cam $11'$ influences the tension of spring $10'$ in a varying degree, depending on the position of lever $12'$. The load linkage operates via lever $16'$, fixed on cam $11'$.

Fuel from holes $9'$ reaches—in part—the ignition burners $17'$ of combustion chambers $6'$. Optionally it is possible to supply the ignition burners from a separate pressure line. The fuel quantity required by the ignition burners is controlled by the fuel pressure which can be adjusted by regulator II. The tension of spring $19'$ can be changed by cam $18'$. This controls the fuel pressure for ignition burners $17'$. Excess fuel leaves regulator II thru hole $21'$ and returns to the tank.

Cam $18'$ can be adjusted in several ways. It must be done in such a way that the mixture ratio for the ignition burners remains approximately the same for all operating conditions. That is why the fuel quantity required by the ignition burners is directly proportional to the air flow thru the ignition combustion chamber. A simple and proven control method is to measure the air thru-flow by a venturi, the resulting pressure bringing about a corresponding adjustment of cam $18'$ via a servo system. In addition it is possible to bring about the control in dependence on atmospheric conditions and revolutions of the engine, as these two quantities essentially determine the air thru-flow thru the ignition combustion chamber. Generally it suffices to let these two control influences work on control member $18'$ via a simple multiplication drive.

Thus, moving load lever 22 brings about on one hand a turning of cam 11 via lever 16 and therefore—by regulator I—a change of the fuel quantity for the main nozzles $5'$ of combustion chambers $6'$; on the other hand the distributor is influenced by lever 23 via block 24. A three-dimensional cam face can effect additional slot adjustments of the rotating discs in dependence on speed and via block 24 in dependence on load, thus additionally controlling the quantity in such a way that the desired fuel quantity is realized exactly for each point of the engine characteristic. In particular it is possible to avoid with certainty—by means of the three-dimensional cam—the "pump" limit of the compressor which is a function of the load and the revolutions.

Via lever 26 and hydraulic valve 27 an adjustment of control member 28 can be effected. This controls the thrust for every operating point and adapts the output of the turbine to the required driving power of the compressor.

By suitable stops mounted on cam 11', f.i., or on lever 12', on the centrifugal governor of distributor 2' and on control member 28, the further critical operating ranges of turbine and combustion chamber can be avoided.

In order that the air supplied into the primary section of the combustion chamber does not fall below a certain minimum value when the engine is idling, and under lower load conditions, a separate compressor 48, which is independent of the engine, may be provided for supplying air to the duct leading into the primary section. This auxiliary compressor 48 may be independently driven or may be driven by the main compressor through a suitable coupling, as, for example, an over-running clutch 31, at speeds above a certain minimum and with a separate drive 49 provided for speeds below this minimum value.

The intermittent injection may be effected with any known control device for this purpose, and may, for example, be effected with the distributors as described in my co-pending application Serial No. 713,184, filed February 4, 1958.

Additionally, the intermittent injection in combination with the two types of vortices, i.e., the toroidal and helical, which occur in the secondary section, promotes improved ignition conditions and improves the combustion efficiency. The intermittent injection creates zones of excess air both in the toroidal vortex and at the edge of the helical vortex, which, combined with the local flow path, promote very high acceleration in the ignition event.

In combustion chambers of conventional construction when the quantity of fuel is cut down by throttling back the engine, the compressor speed is generally reduced, resulting in a decrease of the through-put and delivery head and therefore also a reduction of the temperature rise caused by the compression. This materially lowers the flame-out and ignition limits and greatly increases the danger of flame-out, especially when the engine is operated at higher altitudes, where the ambient temperature is lower.

In accordaice with the present invention, however, because of the separate or partial separate drive for the compressor to the primary section, a minimum temperature and pressure is always guaranteed in the primary section, insuring combustion. Additionally, since the primary section is controlled only for good ignition and complete combustion, the combustion temperature is also close to the optimum obtainable temperature. The heat produced in this chamber will therefore always insure adequate ignition and combustion in the main secondary section. It is also possible, in accordance with the present invention, for operation under exceptionally unfavorable conditions to provide a heating arrangement in the duct 4 to insure safe operation at all times.

Figure 4:
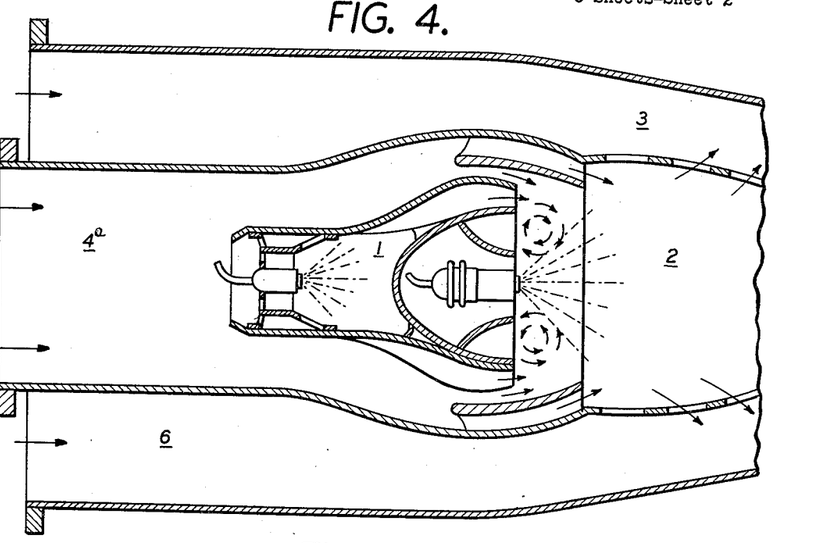
FIG. 4 is a diagrammatic vertical section of a further embodiment of a combustion chamber in accordance with the present invention.

The embodiment as shown in FIG. 4 corresponds exactly in construction and operation to that shown in FIG. 1, except that the primary section 1 and the secondary section 2 have a common air duct 4a, while the tertiary section 3 has a separate air duct 6. The air pressure in the ducts is so arranged that the primary and secondary sections have higher pressure than the tertiary section. This design is simpler than that of the embodiment of FIG. 1, but is generally applicable only to jet engines which do not operate under extreme conditions, because it lacks the great advantage of a pressure differential between the primary and secondary sections.

Figure 5:
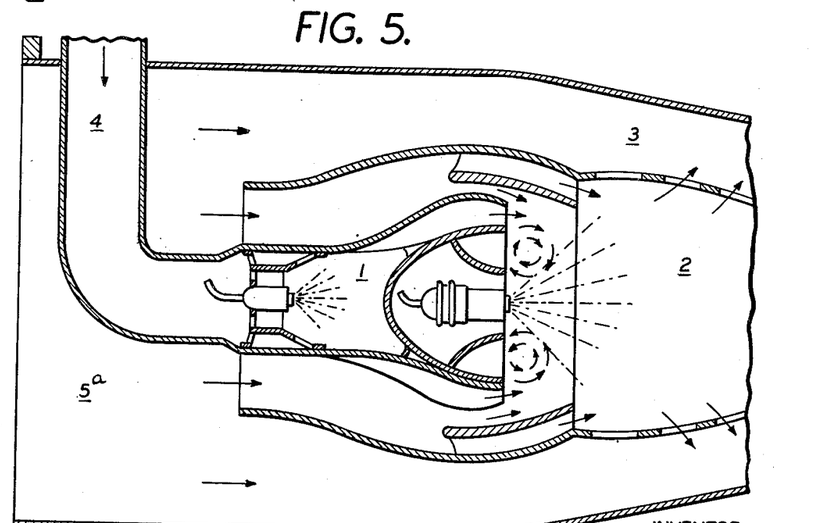
FIG. 5 is a diagrammatic vertical section of a still further embodiment of a combustion chamber, in accordance with the present invention.

The embodiment as shown in FIG. 5 corresponds exactly in the construction and operation to the embodiment shown in FIG. 1, except that in place of the separate ducts 5—6 for the secondary and tertiary sections, respectively, a common duct 5a is provided for both these sections. This embodiment, by having a higher pressure in the primary than in the secondary and tertiary sections, possesses all the advantages of the embodiment of FIG. 1, especially the excellent partial load and idling behavior, and also compensates for the harmful effects of altitude. Because of the somewhat simpler design as compared with FIG. 1, the secondary and tertiary sections have the same pressure level, and temperature distribution in the exit area from the secondary section must therefore be achieved by careful design.

While the present invention has been described in detail with reference to certain specific embodiments, various changes and modifications become apparent to the skilled artisan, which fall within the spirit of the invention and the scope of the appended claims.

I claim:
1. A combustion chamber for jet and similar engines comprising a primary section and a rearwardly positioned secondary section, means for passing fuel into said primary section, means for passing air at a predetermined minimum pressure into said primary section and for combustion with the fuel passed therein, means for intermittently injecting fuel into said secondary section, means for controlling the duration of said individual intermittent injections, means for independently passing a substantially larger quantity of air into said secondary section for combustion of the fuel injected therein, and means for passing the hot combustion gases from said primary section into said secondary section to preheat the combustion air therein.

2. The combustion chamber, as set forth in claim 1, in which said means for passing fuel and air into said primary section are means for passing fuel and air at a mixture ratio sufficient to produce substantially a high combustion temperature to provide favorable conditions for a plane stability in said primary section.

3. The combustion chamber, as set forth in claim 1, including a tertiary section surrounding at least a portion of said secondary section, means for passing combustion gases from said secondary section to said tertiary section, and means for passing combustion air into said tertiary section at a lower pressure than the pressure at which the air is passed into at least one of said primary and secondary sections.

4. The combustion chamber, as set forth in claim 1, in which said means for passing air and said means for passing hot combustion gases into said secondary section include means for imparting a rotary motion to the same.

5. The combustion chamber, as set forth in claim 4, in which said last-mentioned means are means for producing a toroidal vortex intersecting the ignition vortex, and a helical vortex in said secondary section.

6. The combustion chamber, as set forth in claim 1, in which said means for passing air into said primary section and said means for passing air into said secondary section include a main compressor driven by the engine supplying air to both said primary and secondary sections and a supplemental compressor supplying air to said primary section at a pre-determined minimum pressure under all operating conditions.

7. The combustion chamber, as set forth in claim 1, which includes means for passing at least a portion of the combustion air being passed to said secondary section in indirect heat-exchange contact with hot combustion gases being passed from said primary section to said secondary section.

8. The combustion chamber, as set forth in claim 1, which includes means for accelerating said hot combustion gases upon passage into said secondary section.

9. The combustion chamber, as set forth in claim 1, which includes means for heating said combustion air passed to said primary section.

10. A combustion chamber for jet or similar engines comprising a primary section, a substantially co-axially rearward positioned secondary section of greater diameter than said primary section, a tertiary section co-axially positioned rearwardly and outwardly of said second section surrounding at least a portion of the same, a first air duct leading into said primary section, a second air duct surrounding said first air duct and primary section leading into said secondary section, a third air duct surrounding said second air duct and secondary section leading into said tertiary section, means including an injection nozzle for injecting fuel into said primary section for combustion, a housing closing the end of said primary section adjacent said secondary section, annular gas-passage means surrounding said housing extending into said second air duct and defining a path of flow for hot combustion gas from said primary into said secondary section, means including an injection nozzle positioned in said housing for intermittently injecting a substantially larger quantity of fuel into said secondary section for combustion, said annular gas-passage means defining an outlet of reduced cross-section for directing combustion gases into said secondary section to form a toroidal vortex intersecting the ignition vortex formed upon ignition of fuel injected into said secondary section, at an acute angle, the portion of said second air duct adjacent to said gas-passage means defining an inlet into said secondary section dimensioned for directing air therethrough to mix with said toroidal vortex, the outer portion of said second air duct defining an inlet into said second section with twisted guide vanes for directing gas into said second section to form a helical vortex, and a perforated partition separating said second and tertiary sections.

11. The combustion chamber, as set forth in claim 10, in which said annular gas-passage means has a serrated cross-sectional shape extending into said second air duct.

12. A combustion chamber for jet and similar engines comprising a primary section, a substantially co-axially, rearwardly positioned secondary section of greater diameter than said primary section, a tertiary section co-axially positioned rearwardly and outwardly of said secondary section surrounding at least a portion of said secondary section, a first air duct surrounding said primary section leading into said secondary section, means defining an air inlet from said first air duct into said primary section, a second air duct surrounding said first air duct leading into said tertiary section, means including an injection nozzle for injecting fuel into said primary section for combustion, a housing enclosing the end of said primary section adjacent said secondary section, annular gas-passage means surrounding said housing extending into said first air duct and defining a path of flow for hot combustion gases from said primary into said secondary section, means including an injection nozzle positioned in said housing for intermittently injecting a substantially larger quantity of fuel into said secondary section for combustion, said annular gas passage means defining an outlet of reduced cross-section for directing combustion gases from said primary section into said secondary section to form a toroidal vortex intersecting the ignition vortex formed upon ignition of fuel injected into said secondary section at an acute angle, a portion of said first air duct adjacent to said gas-passage means defining an inlet into said secondary section for directing air therethrough to mix with said toroidal vortex, the outer portion of said first air duct defining an inlet into said secondary section with twisted guide vanes for directing gas into said secondary section to form a helical vortex and a perforated partition separating said secondary and tertiary section.

13. The combustion chamber, as set forth in claim 12, in which said annular gas-passage means has a serrated cross-sectional shape extending into said first air duct.

14. A combustion chamber for jet and similar engines comprising a primary section, a substantially co-axially, rearwardly positioned secondary section of greater diameter than said primary section, a tertiary section co-axially positioned rearwardly and outwardly of said secondary section surrounding at least a portion of the same, a first air duct leading into said primary section, a second air duct surrounding said first air duct and said primary section leading into said secondary section, a third air duct surrounding said second air duct leading into said tertiary section, said second air duct merging into said third air duct before said secondary section, means including an injection nozzle for injecting fuel into said primary section for combustion, a housing closing the end of said primary section adjacent said secondary section, annular gas-passage means surrounding said housing extending into said second air duct and defining a path of flow for hot combustion gas from said primary into said secondary section, means including an injection nozzle positioned in said housing for intermittently injecting a substantially larger quantity of fuel into said secondary section for combustion, said annular gas-passage means defining an outlet of reduced cross-section for directing combustion gases into said secondary section to form a toroidal vortex intersecting the ignition vortex formed upon ignition of fuel injected into said secondary section at an acute angle, the portion of said second air duct adjacent to said gas-passage means defining an inlet into said secondary section dimensioned for directing air therethrough to mix with said toroidal vortex, the outer portion of said second air duct defining an inlet into said second section with twisted guide vanes for directing gas into said second section to form a helical vortex, and a perforated partition separating said second and tertiary sections.

15. The combustion chamber, as set forth in claim 14, in which said annular gas-passage means has a serrated cross-sectional shape extending into said second air duct.

16. The combustion chamber, as set forth in claim 1, including means for controlling the quantity of fuel passed into said primary section in dependence on the fuel pressure and means for controlling the quantity of fuel injected into said secondary section in combined dependence on the fuel pressure and engine speed.

17. The combustion chamber, as set forth in claim 16, in which said means for controlling the duration of the individual intermittent injections is means for controlling said duration in dependence on the engine speed.

18. The combustion chamber, as set forth in claim 10, including means controlling the quantity of fuel passed into said primary section in dependence on the fuel pressure and means for controlling the quantity of fuel injected into said secondary section in dependence on the fuel pressure and engine speed.

19. The combustion chamber, as set forth in claim 18, in which said means for controlling the duration of said individual intermittent injections is means for controlling said duration in dependence on the engine speed.

20. The combustion chamber, as set forth in claim 12, including means controlling the quantity of fuel passed into said primary section in dependence on the fuel pressure and means for controlling the quantity of fuel injected into said secondary section in dependence on the fuel pressure and engine speed.

21. The combustion chamber, as set forth in claim 20, in which said means for controlling the duration of the individual intermittent injections is means for controlling said duration in dependence on the engine speed.

22. The combustion chamber, as set forth in claim 1, which includes fuel pressure regulator means controlled by the position of the throttle of the engine and in which said means for intermittently injecting fuel into said secondary section comprises an injection distributor having a pair of rotating discs with overlapping slots defined therethrough, centrifugal governor means connected to said discs for controlling the degree of overlap between said slots in dependence on the engine speed, and including additional means for varying the degree of overlap between said slots in combined dependence on the engine speed and throttle position.

23. The combustion chamber, as set forth in claim 22, in which said additional means includes a cam and cam-follower, and means controlled by the engine speed and throttle position for controlling the point of contact between said cam and cam-follower.

24. The combustion chamber, as set forth in claim 22, in which said additional means includes a cam and cam-follower, means controlled by the engine speed and throttle position for controlling the point of contact between said cam and cam-follower, and said cam being a three-dimensional "space" cam disposed at a safe distance from the points which correspond to the "pump" limit of the compressor.

25. The combustion chamber, as set forth in claim 23, including means for additionally controlling the fuel pressure in dependence on the intake condition of the air being passed to said combustion chamber.

26. The combustion chamber, as set forth in claim 28, in which said means for controlling the duration of said individual intermittent injections is means for controlling said duration in dependence on the engine speed.

27. The combustion chamber, as set forth in claim 25, including means for regulating the pressure of the fuel passed into said primary section in dependence on the quantity and intake condition of air passed into said section to maintain a substantially constant mixture ratio.

28. The combustion chamber, as set forth in claim 14, including means controlling the quantity of fuel passed into said primary section in dependence on the fuel pressure and means for controlling the quantity of fuel injected into said secondary section in dependence on the fuel pressure and engine speed.

References Cited in the file of this patent

UNITED STATES PATENTS

| | | |
|---|---|---|
| 2,404,335 | Whittle | July 16, 1946 |
| 2,480,147 | Letvin | Aug. 30, 1949 |
| 2,629,225 | Ammann | Feb. 24, 1953 |
| 2,734,341 | Lovesey | Feb. 14, 1956 |
| 2,773,350 | Barrett et al. | Dec. 11, 1956 |
| 2,812,637 | Fox | Nov. 12, 1957 |
| 2,825,205 | Racine | Mar. 4, 1958 |

FOREIGN PATENTS

| | | |
|---|---|---|
| 969,610 | France | May 24, 1950 |
| 847,091 | Germany | Aug. 21, 1952 |
| 850,969 | Germany | Sept. 20, 1954 |
| 768,040 | Germany | May 26, 1955 |
| 768,049 | Germany | June 2, 1955 |
| 598,947 | Great Britain | Mar. 2, 1948 |